T. H. BALLARD.

Corn-Planter.

No. 133,618.  Patented Dec. 3, 1872.

Witnesses.
E. H. Bates
F. B. Curtis

Inventor
T. H. Ballard
Chipman Hosmer & Co.
Attys.

UNITED STATES PATENT OFFICE.

THOMAS HENRY BALLARD, OF ELK GROVE, WISCONSIN.

IMPROVEMENT IN CORN-PLANTERS.

Specification forming part of Letters Patent No. 133,618, dated December 3, 1872; antedated November 30, 1872.

*To all whom it may concern:*

Be it known that I, T. H. BALLARD, of Elk Grove, in the county of La Fayette and State of Wisconsin, have invented a new and valuable Improvement in Corn-Planters; and I do hereby declare that the following is a full, clear, and exact description of the construction and operation of the same, reference being had to the annexed drawing making a part of this specification, and to the letters and figures of reference marked thereon.

Figure 1:
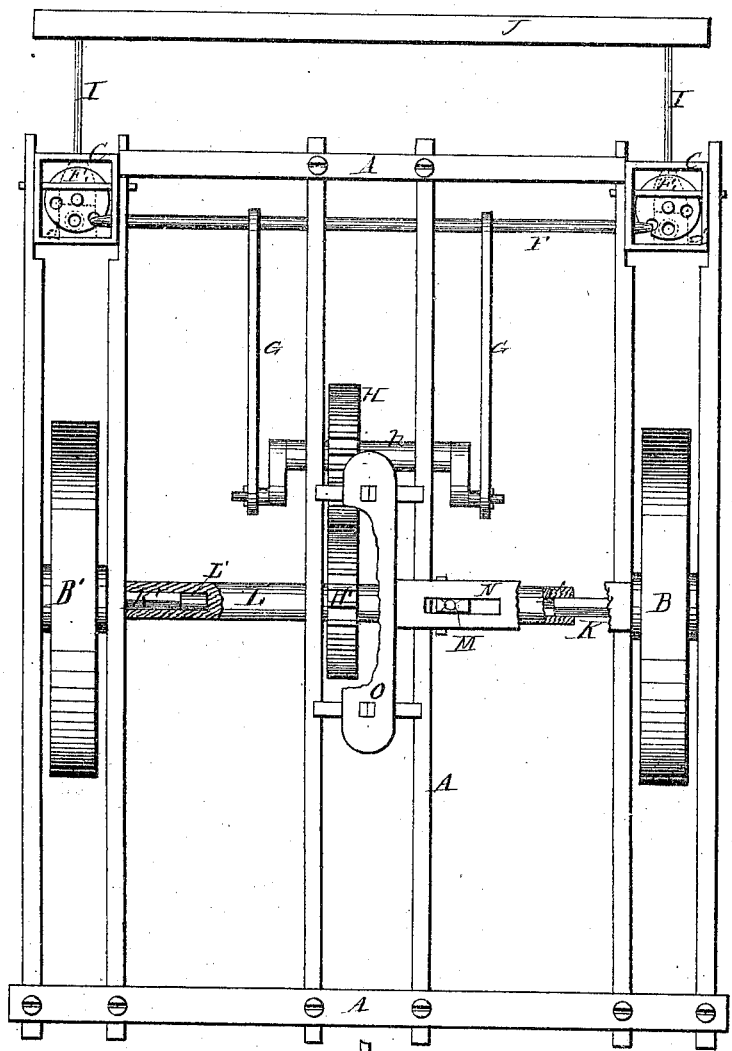
Figure 2:
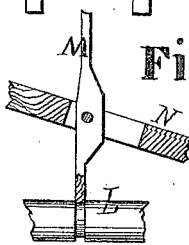

Figure 1 of the drawing is a representation of a plan view of my invention, and Fig. 2 is a detail view.

This invention has relation to corn-planters wherein motion is conveyed to the seeding devices by or through the medium of toothed gearing and other devices operated by the wheel-shaft; and it consists in the construction and novel arrangement of the seeding mechanism, and in the construction and novel arrangement of the driving-shaft, and, in connection therewith, of the axle of the driving-wheel, as hereinafter described.

Referring to the accompanying drawing, A represents the main frame of a corn-planter supported by the driving-wheels B B'. Between the double side bars of the frame, directly before the wheels B B', are arranged the seed-boxes C C, which are provided with seed-spouts $d$, and have longitudinal openings in their inner sides. E represents perforated seeding-disks, pivoted to the bottoms of the seed-boxes. F represents a transverse bar, the ends of which enter the longitudinal openings of the seed-boxes and pass into recesses formed in, or are otherwise movably connected to, the disks E, as shown in the drawing. G designates arms coupling the bar F to a double crank-shaft, $h$, journaled to the frame A, and holding a toothed wheel, H. When the shaft $h$ is rotated a reciprocating movement is given to the bar F, which thereby oscillates the disks E, and causes the corn to be dropped in small quantities and at regular intervals, the seed-opening in the bottom of each box being on a line with the perforations in the disk. I represents runners attached to the seed-spouts, and supporting the transverse bar J. K K' indicate the axles of the driving-wheels, which are short and have their bearings in the double side bars of the frame A. The inner ends of the axles K K' are made square and hold a transverse shaft, L, having square sockets L' in its ends to receive said axles. The shaft L is adjustable along the axles K K', and is moved lengthwise by means of a clutch-lever, M, pivoted to a stand, N. The extreme inner end of the axle K' is rounded; hence when the shaft L is moved toward the other axle the square part of the axle K' comes out, and the shaft revolves independently of it, and is operated by the wheel B. This allows the machine to turn corners more easily, as the wheel B' will tend to stand still and not revolve. At the same time it will disengage the toothed wheel H' from H, and prevent the dropping of seed outside of the hills or furrows. O designates the driver's seat, supported on the frame A, as shown.

I claim as my invention—

In a corn-planter, the combination, with the driving-shaft and crank-shaft $h$, of the spur-wheels H H', arms G, transverse bar F, and boxes C, slotted for the movement of the ends of said bar in operating the seeding-disks, substantially as specified.

In testimony that I claim the above I have hereunto subscribed my name in the presence of two witnesses.

THOMAS HENRY BALLARD.

Witnesses:
EDWARD CHAPPELL,
MORTIMER BALLARD.